United States Patent

[11] 3,540,459

| [72] | Inventors | Arthur W. Grant,<br>Saint Boniface, Manitoba;<br>Casimer J. Welligan, and John J. Raby,<br>Winnipeg, Manitoba, Canada |
|---|---|---|
| [21] | Appl. No. | 723,714 |
| [22] | Filed | April 24, 1968 |
| [45] | Patented | Nov. 17, 1970 |
| [73] | Assignee | Canadian Pacific Railway Company<br>Montreal, Quebec, Canada |
| [32] | Priority | Mar. 27, 1968 |
| [33] | | Canada |
| [31] | | 016,021 |

[54] HOT BOX SENSOR
2 Claims, 3 Drawing Figs.

[52] U.S. Cl. .................................................... 137/74,
246/169
[51] Int. Cl. ........................................................ F16k 17/40
[50] Field of Search........................................ 246/169(A);
220/89(B); 169/42; 137/72, 74, 79 (May issue)

[56] References Cited
UNITED STATES PATENTS

| 1,162,020 | 11/1915 | Bowman...................... | 169/42 |
| 2,089,369 | 8/1937 | Heckert....................... | 169/42UX |
| 2,424,203 | 7/1947 | Wrightman et al. .......... | 246/169(A) |
| 2,501,715 | 3/1950 | Ferguson..................... | 246/169(A) |

Primary Examiner—Arthur L. LaPoint
Assistant Examiner—George H. Libman
Attorney—Smart and Biggar ABSTRACT: The application discloses a device for detecting dangerous overheating of journals in rolling stock and for causing the brakes of the vehicle to be applied in the event of such overheating. The device comprises a plug for the train line of the vehicle which has a disc in one end of the plug the disc being sealed in the plug by solder or being located adjacent to the journal so that when dangerous overheating occurs the solder melts and the disc is blown from the plug to cause the train line to be connected to atmosphere and the brakes of the vehicle applied. The plug comprises a pair of tubular body sections interconnected by a heat insulating element which prevents dissipation of heat into the journal box brass, which might delay melting of the solder.

Patented Nov. 17, 1970 3,540,459
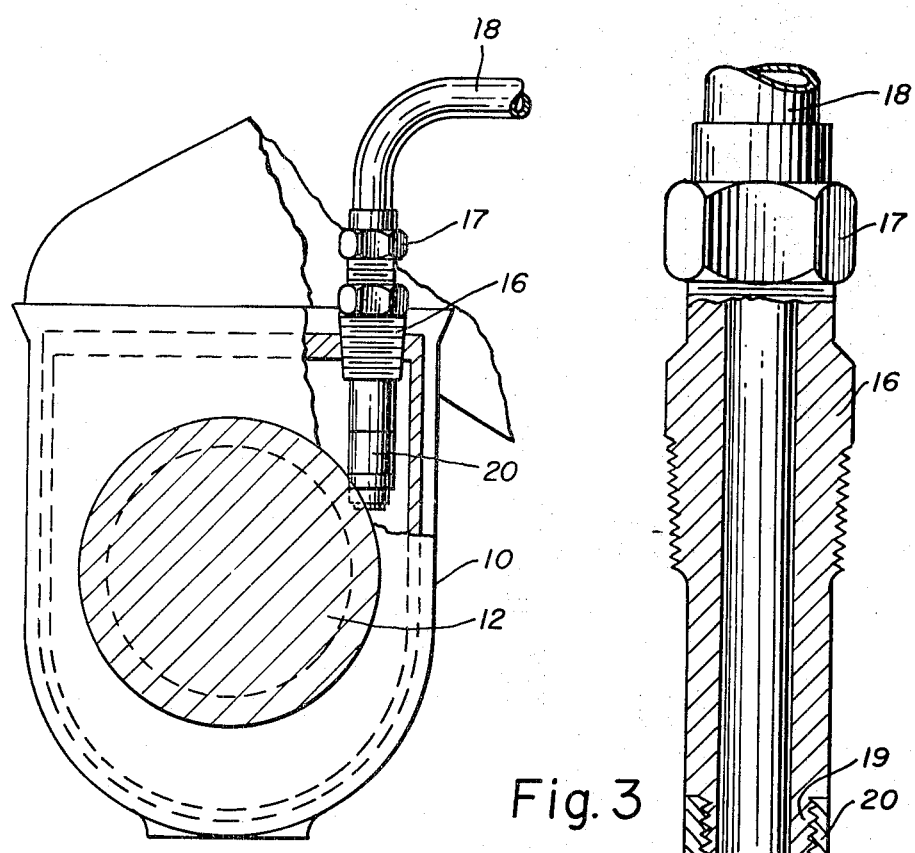
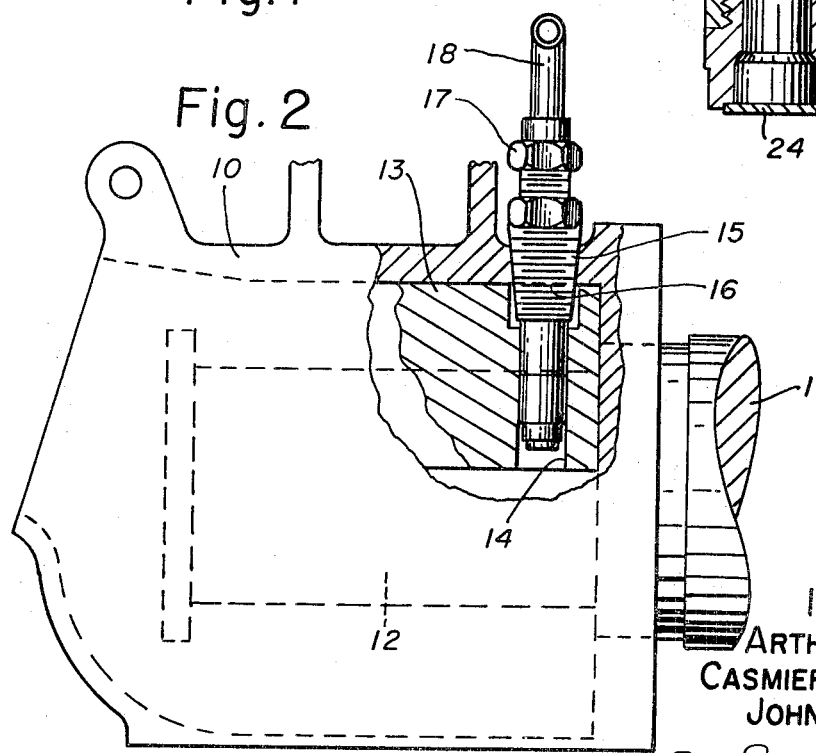
INVENTOR
ARTHUR W. GRANT
CASMIER J. WELLIGAN
JOHN J. RABY
BY- *Smart & Biggar*
ATTORNEYS

HOT BOX SENSOR

BACKGROUND OF THE INVENTION

This invention is concerned with a device for detecting overheating of bearings. It is particularly concerned with a device for detecting overheating of the axle bearings of railroad vehicles and for causing the brakes of the vehicle to be applied in the event of dangerous overheating.

For the sake of brevity throughout this specification the expression railroad vehicles is used to include all manner of rolling stock which embodies a pneumatic braking system.

Vehicles of the kind with which this device was intended for use have train lines which, when they are open to atmospheric pressure, cause the application of the brakes of the vehicle.

In the past, various devices have been proposed to detect overheating of the bearings of these vehicles and, in the event of overheating, to cause the application of the vehicle brakes. These devices have generally comprised temperature sensitive elements located within the journal box of the vehicle, and have consisted of a frangible or fusible plug in the train pipe or in a branch of the train pipe. One example of the prior art devices consisted of a short tubular body adapted to be connected to a branch of the train line and having a plug of fusible material closing one end of the tubular body. The arrangement was such that in the event of overheating, the plug would melt and be blown from the tubular body by the pressure in the train line branch and so connect the train line to atmosphere and apply the brakes of the vehicle.

A problem with these detecting devices is that when the plug melts, initially a first, small aperture appears in that plug and air rushes through that aperture cooling the remaining material of the plug and setting it. It has been found that the small aperture is not sufficient to give an adequate braking force.

SUMMARY OF THE INVENTION

This invention seeks to overcome this disadvantage and provides a plug in the form of a plate of material with a relatively high melting point, sealing the end of a short tubular body and secured to the end of that tubular body by fusible material. In this way, in the event of overheating, the fusible material will melt and the plate will be immediately blown off to vent the train line to atmosphere. The tubular body has two sections interconnected by a heat insulating intermediate section to prevent dissipation of heat into the journal box brass, which might delay melting of the fusible material.

BRIEF DESCRIPTION OF THE DRAWINGS

An embodiment of this invention is illustrated in the accompanying drawings in which:

FIG. 1 is an end view, partly in section of a railroad vehicle journal box with the device of this invention located therein;

FIG. 2 is a front view of the journal box of FIG. 1, again partly in section; and FIG. 3 is a cross-sectional view of the device of this invention on a larger scale than that of FIGS. 1 and 2.

DESCRIPTION OF THE PREFERRED EMBODIMENT

In the drawings there is shown a journal box 10 within which the journal 12 of axle 11 is mounted in bearing block 13.

An open ended bore 14 is formed in the bearing block and the outer end of that bore is in register with a threaded hole 15 in the journal casing.

Screwed into the threaded hole 15 is a generally tubular body part 16 of the device of this invention, which by a union 17 is connected to a branch 18 of the train line. The train line is not shown.

At that end of the body portion 16 remote from its connection to the branch 18, a reduced diameter portion 19 is externally threaded and an internally threaded plastic sleeve 20 is secured to the body portion by cooperation with those screw threads. An end section 21 of the device is of tubular form and has external screw threads 22 by which it is connected to the sleeve 20. At that end of the section 21 remote from its connection to the sleeve 20 a recess is formed to present a radial shoulder 23 upon which is located a disc 24 of metal. That disc 24 is secured in place on the radial shoulder by an alloy which has a melting point below the temperature to which it will be subject in the event of the axle and bearing being subject to a dangerous overheating.

It will be appreciated that the plastic sleeve interconnecting the main body of the device and the end section 21 prevents rapid heat dissipation from the end section by conduction.

In the event of dangerous overheating, the alloy securing plate 24 to the radial shoulder 23, having an appropriately selected melting point, will melt and the pressure in the train line, and the device connected to the train line, will cause the plate 24 to be blown from the shoulder, and the train line to be connected to atmosphere.

We claim:

1. A device for detecting overheating of railroad vehicle axle bearings comprising a main, tubular body section having means by which it may be connected to a train line or to a branch of a train line, a second tubular body section connected to said main section by a heat insulating element and a plate of material of relatively high melting point sealing the end of the second section remote from the heat insulating element and secured to said end by solder between the plate and said end, the solder having a melting point below that temperature to which, when in use, it would be subject in the event of dangerous bearing overheating.

2. A device as claimed in claim 1 in which the heat insulating element comprises a screw threaded sleeve and the main and second body sections each have screw threaded parts by which they may be connected with the sleeve.